United States Patent [19]

Bell

[11] Patent Number: 5,542,509

[45] Date of Patent: Aug. 6, 1996

[54] SHOCK ABSORBER HAVING EXTERNALLY ADJUSTABLE COMPRESSION

[75] Inventor: Stephen H. Bell, Guelph, Canada

[73] Assignees: Gabriel Ride Control Products, Inc., Brentwood, Tenn.; Polaris Industries, LP, Roseau, Minn.

[21] Appl. No.: 546,625

[22] Filed: Oct. 23, 1995

Related U.S. Application Data

[63] Continuation of Ser. No. 459,299, Jun. 2, 1995, abandoned, which is a continuation-in-part of Ser. No. 210,586, Mar. 18, 1994, abandoned, which is a continuation of Ser. No. 212,010, Mar. 11, 1994, abandoned.

[51] Int. Cl.⁶ ........................................ F16F 9/34
[52] U.S. Cl. ..................... 188/322.14; 188/315
[58] Field of Search .................. 188/322.14, 315, 188/285, 281

[56] References Cited

U.S. PATENT DOCUMENTS

| | | | |
|---|---|---|---|
| 2,409,349 | 10/1946 | Focht | 188/315 |
| 4,595,179 | 6/1986 | Glabiszewski | 188/285 X |
| 4,846,317 | 7/1989 | Hudgens | 188/322.14 X |
| 5,234,084 | 8/1993 | Bell | 188/315 X |

FOREIGN PATENT DOCUMENTS

| | | | |
|---|---|---|---|
| 1076192 | 10/1954 | France | 188/315 |
| 741272 | 11/1943 | Germany | 188/322.14 |
| 778281 | 7/1957 | United Kingdom | 188/315 |

*Primary Examiner*—Lee Young
*Assistant Examiner*—Kevin D. Rutherford
*Attorney, Agent, or Firm*—McAndrews, Held & Malloy, Ltd.

[57] ABSTRACT

A compression adjustment mechanism for a shock absorber includes a screw cam which is screwed into a bore in the endcap of the shock absorber and which abuts the spring seat for the compression or blow off valve spring. Tightening or loosening the screw cam, relative to the endcap, causes the preload of the compression valve spring to increase or decrease, thereby increasing or decreasing, respectively, the compression forces in the shock absorber. The compression adjustment mechanism can act on the spring seat from any direction, thereby eliminating the need to selectively orient the working cylinder and compression head assembly to the outer cylinder and endcap assembly during assembly of the shock absorber.

3 Claims, 3 Drawing Sheets

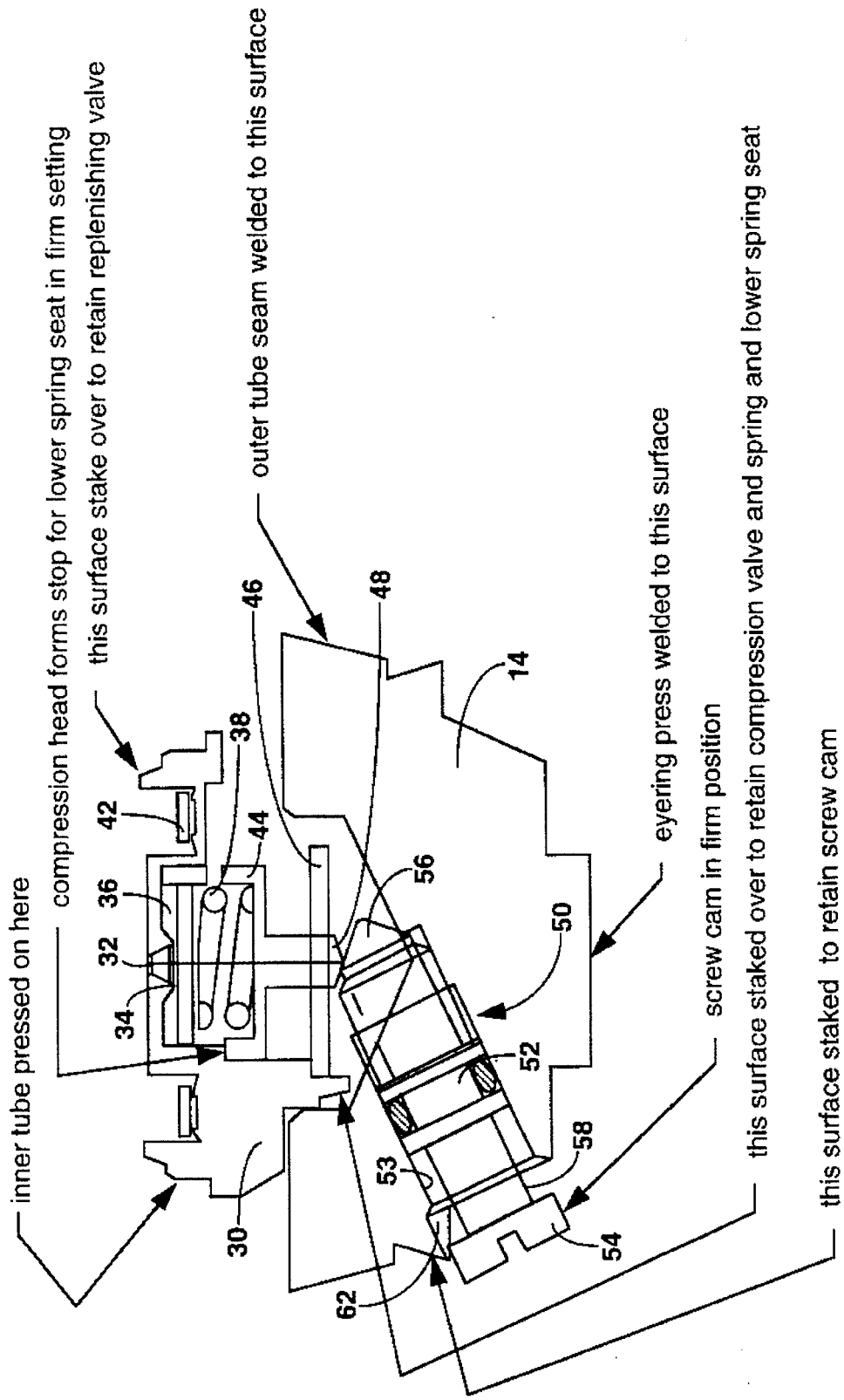
FIG. 2     FIRM SETTING

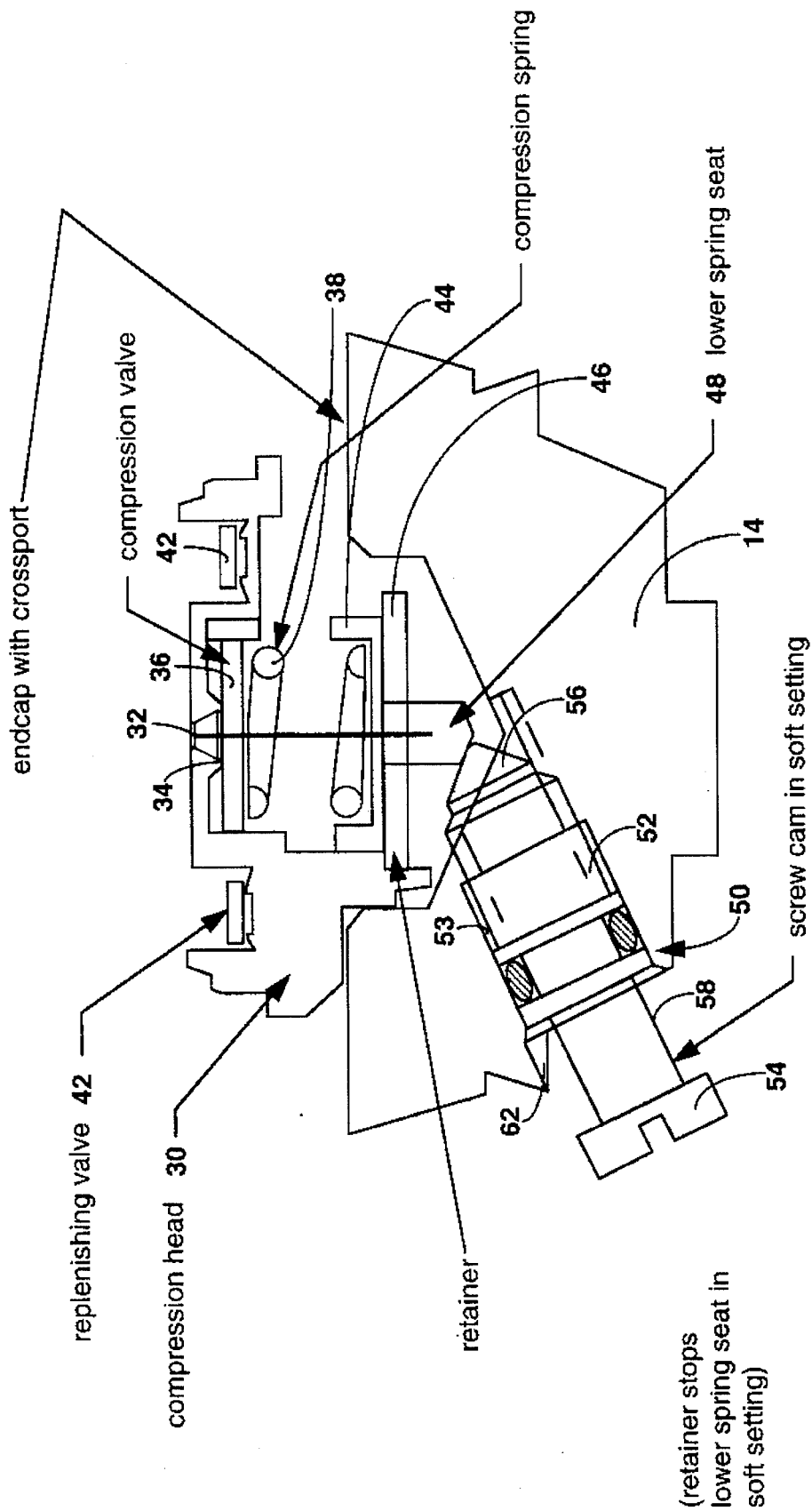
FIG. 3  SOFT SETTING

SHOCK ABSORBER HAVING EXTERNALLY ADJUSTABLE COMPRESSION

RELATED U.S. APPLICATIONS

This is a continuation of now abandoned application Ser. No. 8/459,299 filed Jun. 2, 1995; which is a continuation-in-part of Ser. No. 08/210,586, filed Mar. 18, 1994 (now abandoned), and which is a continuation of application Ser. No. 08/212,010 filed, Mar. 11, 1994 (now abandoned).

BACKGROUND OF THE INVENTION

The present invention relates to hydraulic shock absorbers, and more particularly, to a shock absorber of the double-acting tubular type having an improved mechanism for adjusting the compression forces in the shock absorber. The shock absorber is especially useful on vehicles such as snowmobiles.

Double-acting shock absorbers utilized on vehicles usually comprise an inner or working cylinder attached, at one end and through an end cap, to the unsprung mass of the vehicle; and a piston that is movable within the inner cylinder, that has a piston rod extending out of the other end, the rod end, of the inner cylinder, and that is connected with the sprung mass of the vehicle, via the piston rod, so that when the vehicle passes over an uneven surface, the piston and inner cylinder move relative to one another. The inner cylinder contains suitable hydraulic damping fluid that may be transferred across the piston by means of valving in the piston. During the so called compression stroke of the shock absorber, that is, when the axle and frame move toward one another, a relatively small amount of the fluid is expelled from the one end of the cylinder into a reservoir which is, conventionally, an annular space defined between the inner cylinder and a surrounding outer cylinder.

The flow of fluid expelled from the cylinder during a compression stroke is typically controlled by a compression valve positioned in the compression head assembly of the shock absorber. The compression valve is normally spring biased to a closed position. During the compression stroke, fluid pressure increases in the cylinder. When the fluid pressure reaches a predetermined level, the pressure overcomes the spring load or bias on the compression spring, causing the compression valve to open and allowing fluid to flow from the inner cylinder into the reservoir.

It is known in the art that the compression forces of the shock absorber are dependent upon the load or tension on the compression valve spring. By adjusting the tension on the compression valve spring, it is possible to adjust the compression forces of the shock absorber and thereby adjust the ride or feel according to snow or road conditions so as to achieve user satisfaction.

OBJECTS AND SUMMARY OF THE INVENTION

One of the principal objects of the present invention is to provide an improved shock absorber in which the compression forces may be easily adjusted, i.e. increased or decreased, so that the person riding the vehicle, e.g. a snowmobile, may readily select a desired ride or feel, i.e., a harder or softer ride or feel.

A further object of the present invention is to provide an improved shock absorber of the type described having a compression force adjusting mechanism which does not require a particular orientation of the inner cylinder, and its compression head assembly, to the outer cylinder and endcap, thereby facilitating the manufacturing assembly of the shock absorber.

Another object of the present invention is to provide an improved shock absorber of the type described having a compression force adjusting mechanism which uses components that can be mass produced and are economical to manufacture and assemble.

Still another object of the present invention is to provide the improved shock absorber of the type described where the improved shock absorber comprises an inner tubular member defining a cylindrical chamber; a piston slidably mounted within the cylindrical chamber; a piston rod extending from one side of the piston outwardly from the rod end of the tubular member; closure means on the rod end of said tubular member, closing the rod end of said tubular member and slidably, sealingly engaging the piston rod; an end cap or closure on the opposite end of said tubular member; hydraulic fluid filled rebound and compression chambers within said cylindrical chamber on the piston rod side of said piston and on the opposite side thereof, respectively; means to accommodate the flow of hydraulic fluid resulting from piston rod displacement, with the accommodation means comprising a compression valve and a compression spring biasing the compression valve into a normally closed position; and means for adjusting the bias in the compression spring.

These and other objects, advantages and benefits of the present invention will become more apparent from the following detailed description.

DESCRIPTION OF TEE DRAWINGS

The present invention may be best understood with reference to the accompanying drawings illustrating the preferred embodiment of the invention, wherein:

FIG. 2 is a cross-sectional view of the compression head assembly and endcap of the shock absorber of FIG. 1, showing the improved adjusting mechanism in the firm setting position.

FIG. 3 is a cross-sectional view of the compression head assembly and endcap of the shock absorber of FIG. 1, showing the improved adjusting mechanism in the soft setting position.

Figure 1:
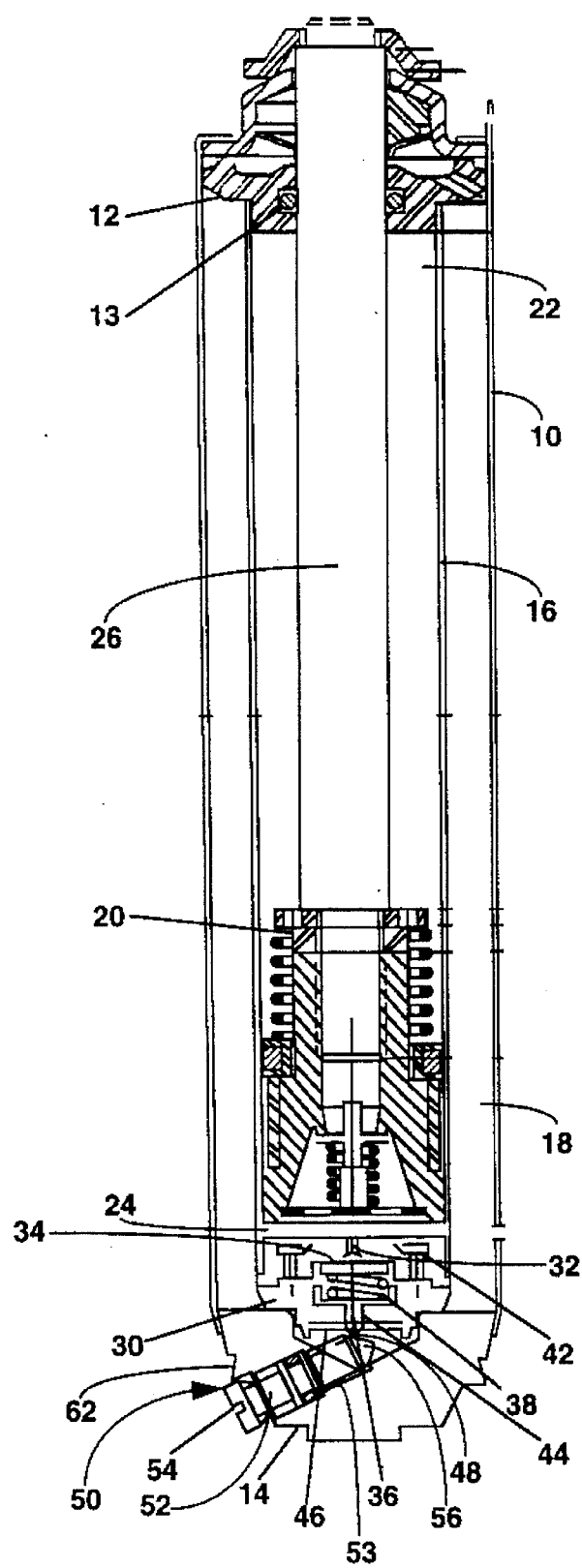
FIG. 1 is a cross-sectional view of a shock absorber embodying the principles of the present invention.

In the following Description of the Preferred Embodiment, the terms "upper", "lower", "upwardly", "downwardly" and the like will be used. It should be understood that these terms have reference to the embodiment as shown in the drawings.

DETAILED DESCRIPTION OF TEE PREFERRED EMBODIMENT

Referring to FIG. 1, there is shown a double-acting hydraulic shock absorber comprising a substantially cylindrical outer cylinder or casing 10. The upper or rod end of the cylinder 10 receives and is closed by a closure assembly 12. The lower end of the cylinder 10 receives and is closed by an endcap 14.

The shock absorber includes an inner or working cylinder 16 that defines a cylindrical chamber and within which a piston 20 (which may be a piston assembly) is slidably mounted. The piston 20 divides the cylindrical chamber into an upper rebound or recoil chamber 22 and a lower compression chamber 24.

A piston rod 26 is connected with the piston 20 and extends out of the upper or rod end of the shock absorber through the assembly 12. A conventional seal 13 is carried by the assembly 12 and seals the piston rod 26 as it slidingly passes through the assembly 12.

The upper end of the rod 26 (not shown) is connected, in a conventional manner, to the sprung mass of a vehicle. The endcap 14 is also provided with an eyering (not shown) on its outer, exterior or lower surface for connecting the lower end of the shock absorber with the unsprung mass of the vehicle, as is well known in the art.

It will be understood that the rebound and compression chambers are filled with hydraulic fluid in a conventional manner. The inner cylinder 16 is disposed within the outer casing 10 in a spaced concentric relationship therewith so that the annular space defined by the casing 10, the cylinder 16, the closure assembly 12, and the endcap 14 constitutes a generally annular reservoir 18 for the hydraulic fluid in the shock absorber.

The piston 20, its associated piston rod 26, and the closure assembly 12 may be identical in structure and function to those described in commonly assigned U.S. Pat. No. 5,234,084, which patent is herein specifically incorporated by reference.

As noted, the lower end of the inner cylinder 16 is connected with a compression head assembly 30 and, the lower end of the assembly 30 is connected with the endcap 14. The compression head assembly 30 includes a port 32 of fixed diameter, and a compression valve seat 34 which surrounds the port 32. A compression or blow off valve 36 is normally held closed against the compression valve seat 34 by a coil compression spring 38. This compression spring is seated on a lower, spring seat 44 that is slidably mounted within a lower facing counterbore in the compression head assembly 30. A retaining plate 46, which includes a central aperture, limits the downward travel of the spring seat 44 and functions to hold the compression valve 36, the compression spring 38 and the spring seat 44 in the compression head assembly 30. The spring seat 44 has a lower depending, centrally disposed member 48 that is slidably received within the aperture in the plate 46 and projects below the plate 46.

During a compression stroke, pressure from the hydraulic fluid acts on the compression valve 36 causing it to unseat from the valve seat 34. Fluid then flows through the port 32 from the compression chamber 24 and into the reservoir 18.

"A replenishing valve 42 is floatably retained in the top portion of the compression head assembly 30. It opens or unseats to allow hydraulic fluid to be replenished to the inner cylinder 16 during the rebound or recoil stroke of the shock absorber."

A compression adjustment mechanism, generally indicated at 50, is provided to adjust the preload or tension of the compression spring 38, and thereby to adjust the compression forces of the shock absorber. The compression adjustment mechanism 50 comprises a screw 52 which is threadingly screwed and conventionally seated into a bore 53 in the endcap 14. The central axis of the bore 53 is at an acute angle, e.g. 65°, with respect to a central longitudinal axis of the shock absorber. The screw 52 has outer screw threads which mate with screw threads within the bore 53 as the screw 52 is screwed into the bore. The screw 52 has a slotted head 54, at its outward end. The slotted head 54 is adapted to receive a screw driver or similar tool for rotating the screw about its central axis and thereby advancing or retracting the screw into or out of the threaded bore 53. The screw 52 also has a cone-shaped, cam surface 56 at its inward end. Compression forces in the shock absorber are increased when the screw 52 is turned so that the screw advances into the bore. This causes the cone-shaped cam surface 56 to contact the lower facing surface of the member 48 of the spring seat 44, which lower facing surface is suitably angled and positioned to interface with and contact the cone-shaped cam surface 56.

Turning now to FIG. 2, continued rotational advancing of the screw 52 into the bore 53 in the endcap 14 causes the cam surface 56 to push against the lower facing surface of the member 48. This in turn causes the spring seat 44 to move or slide upwards within the compression head assembly 30. As a result, the compression spring 38 preload or tension is increased which thereby increases shock compression forces. The maximum compression force (or firmest setting) and rotational advancing of the screw 52 occurs when the upward movement of the lower spring seat 44, due to action from the cam surface 56, is stopped by the lower spring seat 44 reaching the end of the counterbore in which it slides in the compression head assembly 30.

Turning now to FIG. 3, counter rotation of the screw 52 out of the bore 53 of the endcap 14 softens the compression forces. This allows the compression spring 38 to force the spring seat 44 down along with and to follow the cam surface 56 on the end of the screw. This downward movement of the spring seat 44 in the compression head assembly 30 expands the compression spring 38 thereby reducing its preload and causing the shock compression forces to soften. Downward movement of the spring seat 44 caused by expansion of the compression spring 38 is limited by the retaining plate 46 which is staked into the lower side or end of the compression head assembly 30. The soft setting preload of the compression spring 38 occurs when the spring seat 44 bottoms on the retaining plate 46. In order to limit the outward or counter threading movement of the screw, a downward facing ridge 62 on the endcap 14 is staked. This ridge 62 contacts a shoulder adjacent the inner portion of the recess 58 in the screw 52 adjacent to the screw head 54 and prevents further outward movement of the screw with respect to the bore 53.

Because of the cone-shaped cam surface 56 and the correspondingly angled cone-shaped lower facing surface of the member 48, the compression adjusting mechanism 50 can be positioned from any radial direction about the central longitudinal axis of the shock absorber, i.e. it does not require a fixed radial orientation of the screw 52 with respect to the central longitudinal axis of the shock absorber. The design of the mechanism thus does not require the inner cylinder 16 and compression head assembly 30 to be oriented to the outer cylinder 10, the endcap 14 and the adjusting mechanism 50, resulting in a much easier and expeditious assembly of the shock absorber.

While the compression adjustment mechanism 50 of the invention has been illustrated in connection with one type of piston valving arrangement, it will be understood that the invention can be used with other piston valving arrangements. In particular, the present invention can be used with a piston valving arrangement other than as disclosed in U.S. Pat. No. 5,234,084.

The preferred embodiment of the invention disclosed herein is illustrative of the invention, and it will be understood that the invention is not limited thereto since modifications may be made by those skilled in the art. It is therefore contemplated by the appended claims to cover any such modification which incorporates those features which come within the true spirit and scope of the invention.

What is claimed is:

1. In a shock absorber including: an inner tubular member that defines a cylindrical chamber having a central longitudinal axis; an outer tubular member that is coaxial with the inner tubular member; a piston that is slidably mounted within the cylindrical chamber parallel to the central longitudinal axis of the cylindrical chamber; a piston rod that extends from one side of the piston outwardly from one end of the tubular member and that has a longitudinal axis which is coaxial with the axis of the cylindrical chamber; means on the one end of said tubular member for closing the one end of said tubular member and for slidably sealingly engaging the piston rod; a hydraulic fluid filled rebound chamber and a hydraulic fluid filled compression chamber, defined within said cylindrical chamber on the piston rod side of the piston and on the opposite side of the piston, respectively; a hydraulic fluid reservoir defined by the inner tubular member and the outer tubular member; means for permitting the flow of hydraulic fluid between the reservoir and the compression chamber and between compression and rebound chambers to accommodate the flow of hydraulic fluid resulting from piston and piston rod displacement within the tubular member, the improvement comprising:

(A) a compression head subassembly which is adapted to be brought to and assembled onto the other end of the inner tubular member as a completely self contained subassembly and which includes: a replenishing valve and a centrally disposed, spring biased compression valve, which valves are in fluid communication with the reservoir and the compression chamber; a first counterbore having a first end, a second end, and a central longitudinal axis generally parallel to the central longitudinal axis of the cylindrical chamber, with the first end of the first counterbore being adjacent to the compression valve, and with the second end of the first counterbore being open to the exterior of the compression head sub-assembly; a movable spring seat that is disposed in the first counterbore, that is adapted to be moved, in the first counterbore and parallel to the central longitudinal axis of the first counterbore, toward and away from the first end of the first counterbore, and that includes a member which, in part, protrudes out of the second end of the first counterbore; means for limiting the movement of the spring seat toward the first end of the first counterbore; a coil compression spring disposed within the first counterbore, with one end of the spring being connected with the compression valve and with the other end of the spring being connected with the spring seat; means for limiting the movement of the spring seat away from the first end of the first counterbore and for preventing removal of the spring and spring seat from the second end of the first counterbore; and a first surface that includes, in part, the second end of the counterbore and that has a preselected configuration; and (B) an end cap subassembly which is adapted to be brought to and assembled onto the other end of the outer tubular member as a completely self contained subassembly after the compression head assembly has been assembled onto the other end of the inner tubular member and which includes: a second counterbore having a first end and a second end, with the first end of the second counterbore being open to the exterior of the end cap subassembly; a threaded screw having a first end and a second end, with the screw being threadingly received within the second counterbore, with the first end of the screw having a head thereon and being adjacent to the first end of the second counterbore, and with the second end of the screw having means adapted to protrude out of the second end of the second counterbore for engaging the protruding part of the spring seat member; a first surface that includes, in part, the second end of the second counterbore and that has a configuration substantially matching the configuration of the first surface of the compression head subassembly so that when the end cap subassembly is brought to and assembled onto the other end of the outer tubular member, the first surfaces of the compression head and end cap subassemblies are in substantial surface-to-surface contact, the second ends of the first and second counterbores are adjacent to each other such that the second end of the screw is adapted to engage the protruding part of the spring seat and such that selective rotation of the screw, relative to the second counterbore, will move the spring seat selectively toward or away from the one end of the first counterbore.

2. The improved shock absorber according to claim 1 wherein the central longitudinal axes of the screw and the second counterbore are disposed at an acute angle with respect to the plane of the central longitudinal axis of the cylindrical chamber; and wherein the other end of the screw is a cone-shaped cam surface that is adapted to engage a corresponding surface on the protruding part of the spring seat.

3. The improved shock absorber according to claim 2 wherein the radial orientation of the longitudinal central axis of the screw, relative to the central longitudinal axis of the cylindrical chamber, is unrestricted.

* * * * *